Oct. 13, 1925.
G. J. THOMAS
1,556,978
BRAKE OPERATING MECHANISM
Filed April 13, 1925
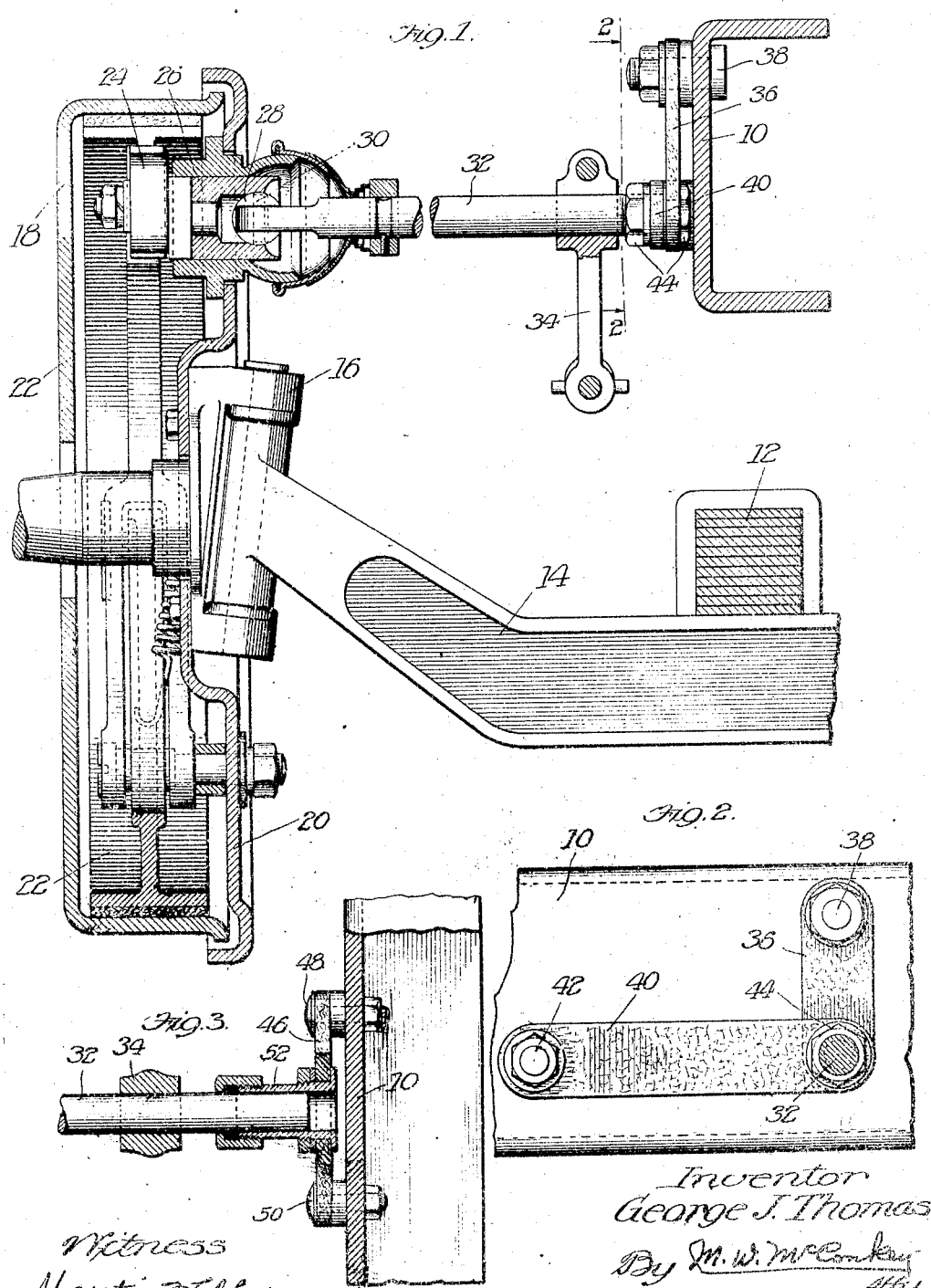
Witness
Martin F. Olsen
Inventor
George J. Thomas
By M. W. McConkey
Atty.

Patented Oct. 13, 1925.

1,556,978

UNITED STATES PATENT OFFICE.

GEORGE JOSEPH THOMAS, OF SOUTH BEND, INDIANA, ASSIGNOR TO THE BENDIX CORPORATION, OF CHICAGO, ILLINOIS.

BRAKE-OPERATING MECHANISM.

Application filed April 13, 1925. Serial No. 22,733.

*To all whom it may concern:*

Be it known that I, GEORGE J. THOMAS, a citizen of the United States, and a resident of South Bend, St. Joseph County, Indiana, have invented certain new and useful Improvements in Brake-Operating Mechanism, of which the following is a specification.

This invention relates to brakes, and is illustrated as embodied in an automobile chassis. An object of the invention is to provide an inexpensive substitute for the usual mechanical joint of the brake control, at the chassis frame, by supporting the inner end of the rockshaft or other brake-operating member by means of fabric, which can flex to compensate for the movement of the brake-operating member. The fabric is shown, in one arrangement, fastened to the frame above the end of the rockshaft, to support it, and preferably also fastened to the chassis frame ahead of the rockshaft, to resist the pull from the pedal in applying the brakes.

The above and other objects and features of the invention, including various novel combinations of parts and desirable particular constructions, will be apparent from the following description of the illustrative embodiments shown in the accompanying drawings, in which:

Fig. 1 is a vertical transverse section through one front brake and associated parts;

Fig. 2 is a vertical section on the line 2—2 of Fig. 1, showing the mounting of the fabric on the chassis frame; and Fig. 3 is a horizontal section showing a modification.

In the arrangement of Figs. 1 and 2, the invention is embodied in a chassis having a frame, one side member 10 of which is shown, supported by springs 12 on a rear axle (not shown), and on a front axle 14 having the knuckles 16 swivelled thereto by the usual king pins. The front wheel (not shown) carries the brake drum 18, and the knuckle carries the non-rotatable backing plate 20.

The illustrated brake includes shoes 22, expanded against the drum by a double cam 24 carried by a short shaft 26 having a cross bore for two members 28 between which is swivelled by a vertical pin 30 the flattened end of a shaft 32 rocked by an arm 34 to apply the brake.

Preferably the inner end of the shaft is supported by a vertical strip 36 of heavy fabric, such as is used for spring shackle substitutes and the like, and which swings back and forth to compensate for movements of shaft 32 due to spring movement. Strip 36 is secured to side frame member 10 by a bolt 38, or in any other desired manner. The pull from arm 34 may be taken by a second strip 40, integral with or separate from strip 36, secured to the frame 10 at 42. The strips are perforated to receive the end of shaft 32, which may be threaded to receive the clamp nuts 44. It will be seen that the strips provide an inexpensive universal support for the end of the shaft, and moreover a support which does not require lubrication or other attention.

The arrangement of Fig. 3 differs from that described above in that a single horizontal fabric strip 46, secured to the frame 10 at 48 and 50, carries at its center a metal sleeve 52 slidably supporting the end of shaft 32.

While two illustrative embodiments have been described in detail, it is not my intention to limit the scope of the invention to those particular embodiments, or, otherwise than by the terms of the appended claims.

I claim:

1. Operating mechanism for a brake acting on a front wheel swivelled at the end of an axle supporting a chassis frame, and comprising, in combination with said parts, a rockshaft operating the brake and arranged above and generally parallel with the axle, and fabric secured to the chassis frame and supporting the inner end of the rockshaft, the fabric being sufficiently flexible to compensate for movements of the rockshaft.

2. Operating mechanism for a brake acting on a front wheel swivelled at the end of an axle supporting a chassis frame, and comprising, in combination with said parts, a rockshaft operating the brake and arranged above and generally parallel with the axle, and fabric supporting the inner end of the rockshaft and flexing to compensate for movements of the rockshaft, and means for securing the fabric to the chassis frame ahead of the rockshaft.

3. Operating mechanism for a brake acting on a front wheel swivelled at the end of an axle supporting a chassis frame, and comprising, in combination with said parts, a rockshaft operating the brake and arranged above and generally parallel with the axle, and fabric supporting the inner end of the rockshaft and flexing to compensate for movements of the rockshaft, and means for securing the fabric to the chassis frame above the rockshaft.

4. Operating mechanism for a brake acting on a front wheel swivelled at the end of an axle supporting a chassis frame, and comprising, in combination with said parts, a rockshaft operating the brake and arranged above and generally parallel with the axle, and fabric supporting the inner end of the rockshaft and flexing to compensate for movements of the rockshaft, and means for securing the fabric to the chassis frame above the rockshaft to support the rockshaft and to secure the fabric to the chassis frame ahead of the rockshaft to take the pull on the rockshaft in applying the brakes.

5. Operating mechanism for a brake acting on a front wheel swivelled at the end of an axle supporting a chassis frame, and comprising, in combination with said parts, a movable member operating the brake, and a fabric secured to the chassis frame and supporting said member and flexing to compensate for movement of said member.

In testimony whereof I have hereunto signed my name.

GEORGE JOSEPH THOMAS.